US 9,263,713 B2

(12) United States Patent
Kim

(10) Patent No.: US 9,263,713 B2
(45) Date of Patent: Feb. 16, 2016

(54) BATTERY PACK

(75) Inventor: Myeongcheol Kim, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 622 days.

(21) Appl. No.: 12/838,311

(22) Filed: Jul. 16, 2010

(65) Prior Publication Data

US 2011/0293973 A1   Dec. 1, 2011

Related U.S. Application Data

(60) Provisional application No. 61/348,447, filed on May 26, 2010.

(51) Int. Cl.
*H01M 2/12* (2006.01)
*H01M 2/04* (2006.01)
*H01M 2/02* (2006.01)
*H01M 2/10* (2006.01)

(52) U.S. Cl.
CPC ............ *H01M 2/0434* (2013.01); *H01M 2/024* (2013.01); *H01M 2/0247* (2013.01); *H01M 2/04* (2013.01); *H01M 2/1083* (2013.01)

(58) Field of Classification Search
CPC .......... H01M 2220/20; H01M 2/0245; H01M 2/0275; H01M 2/0237; H01M 2/024; H01M 2/0242; H01M 2/0434; H01M 2/04; H01M 2/1083
USPC ........................................................ 429/163
See application file for complete search history.

(56) References Cited

U.S. PATENT DOCUMENTS

| 1,535,906 | A | 4/1925 | Davoll |
| 7,713,655 | B2 * | 5/2010 | Ha et al. ........................ 429/99 |
| 2001/0049055 | A1 * | 12/2001 | Saito ............................ 429/175 |
| 2003/0059679 | A1 * | 3/2003 | Rodriguez et al. ............ 429/177 |
| 2004/0043663 | A1 * | 3/2004 | Ikeda et al. ................... 439/627 |
| 2006/0093901 | A1 * | 5/2006 | Lee et al. ...................... 429/120 |
| 2009/0208828 | A1 * | 8/2009 | Kanai et al. .................. 429/120 |
| 2009/0325049 | A1 | 12/2009 | Niedzwiecki et al. |

FOREIGN PATENT DOCUMENTS

| DE | 198 22 059 A1 | 11/1999 |
| JP | 09-011759 | 1/1997 |
| JP | 10-199497 | 7/1998 |
| JP | 2006-147415 | 6/2006 |

(Continued)

OTHER PUBLICATIONS

KIPO Office Action dated Nov. 9, 2011 in corresponding Korean application 10-2010-0078865, pp. 1-5.
Extended European Search Report dated Nov. 19, 2010 issued by the EPO to European Patent Application No. 10174093.4 corresponding to this application, listing the cited references in this IDS, 6 pages.

(Continued)

*Primary Examiner* — Ula C Ruddock
*Assistant Examiner* — Lisa S Park
(74) *Attorney, Agent, or Firm* — Lewis Roca Rothgerber Christie LLP

(57) ABSTRACT

A battery pack includes a battery module including a plurality of battery cells; a housing accommodating the battery cells, the housing having a bottom plate and a plurality of side walls extending from the bottom plate; and a middle cover covering the battery module, the middle cover having a body and a coupling flange extending away from the body and located between one of the side walls and the battery module.

15 Claims, 11 Drawing Sheets

(56) References Cited

FOREIGN PATENT DOCUMENTS

| | | | | |
|---|---|---|---|---|
| JP | 2007-172981 | 7/2007 | | |
| JP | 2008-282625 | 11/2008 | | |
| JP | 2011-146151 | 7/2011 | | |
| KR | 1020060118295 A | 11/2006 | | |
| KR | 1020070097150 A | 10/2007 | | |
| KR | 1020090029148 A | 3/2009 | | |
| WO | WO 99/59841 A1 | 11/1999 | | |
| WO | WO2006135008 | * 12/2006 | ............ | H01M 10/50 |

OTHER PUBLICATIONS

Japanese Office action dated Dec. 18, 2012, for corresponding Japanese Patent application 2010-287635, (2 pages).

Patent Abstracts of Japan, and English machine translation of Japanese Publication 10-199497 listed above, (5 pages).

Patent Abstracts of Japan, and English machine translation of Japanese Publication 2011-146151 listed above, (21 pages).

Chinese Office action dated Jun. 5, 2013 issued to corresponding Chinese Application No. 201110043032.6, 18 pages.

* cited by examiner

644

744

844

BATTERY PACK

CROSS-REFERENCE TO RELATED APPLICATIONS

This application claims the benefit of U.S. Provisional Application No. 61/348,447, filed on May 26, 2010, in the United States Patent and Trademark Office, the disclosure of which is incorporated herein in its entirety by reference.

BACKGROUND

1. Field

An embodiment of the present invention relates to a battery pack.

2. Description of Prior Art

In general, a medium-sized battery pack including a plurality of battery cells is primarily used as a power source of an electric bicycle or an electric motorcycle. The battery pack includes a plurality of rechargeable battery cells, a housing for accommodating the plurality of rechargeable battery cells, and a battery monitoring system (BMS) board for monitoring the plurality of rechargeable battery cells.

The battery cells are typically lithium ion batteries, lithium polymer batteries, or lithium ion polymer batteries, and the housing may be made of a plastic-injected material. In addition, the BMS board is electrically connected to the battery cells to control charge and discharge of the battery cells and to calculate the capacities of the battery cells. Further, the BMS board includes a connector to be electrically connected to an external device (e.g., a charger or a load).

SUMMARY

Embodiments of the present invention provide a battery pack configured to prevent or minimize a plurality of rechargeable battery cells from vibrating inside a housing.

According to one embodiment of the present invention, a battery pack is provided including a battery module including a plurality of battery cells; a housing accommodating the battery cells, the housing having a bottom plate and a plurality of side walls extending from the bottom plate; and a middle cover covering the battery module, the middle cover having a body and a coupling flange extending away from the body and located between one of the side walls and the battery module.

In one embodiment, the coupling flange has a length of between about 1% to about 20% of a length of the one of the side walls. Further, the coupling flange may contact one of the side walls and the battery module and may narrowingly taper in a direction away from body. In one embodiment, an end of the coupling flange is substantially planar and further, the coupling flange may correspond to three sides of the battery module.

In one embodiment, an upper cover is coupled to the housing, wherein the middle cover is substantially between the upper cover and the battery module. Further, the side walls may have a plurality of coupling grooves, wherein the middle cover further comprises a plurality of auxiliary couplers, each of the auxiliary couplers being located in a respective one of the coupling grooves. The body and the coupling flange may be separate components and a cross-section of the coupling flange may be substantially rectangular, substantially ovular or substantially circular.

In one embodiment, an angle between the side walls and the bottom plate is greater than 90 degrees, and more specifically, may be between about 91 degrees and about 95 degrees. Additionally, the battery module may include a plurality of bus bars extending between adjacent battery cells to electrically connect the battery cells to each other and wherein the middle cover has a plurality of bus bar accommodating portions contacting a respective one of the bus bars. In one embodiment, each of the bus bar accommodating portions comprises a first flange extending in a direction away from the coupling flange and a second flange extending from and in a direction substantially perpendicular to the first flange. Further, the middle cover may have a plurality of gas release openings, each of the gas release openings corresponding to a respective one of the battery cells.

According to aspects of the invention, the coupling portion is combined with or inserted into the gap or space between the sidewalls of the housing and each of the battery cells, thereby preventing the battery cells from vibrating inside the housing.

In other words, the plurality of battery cells securely contact with the coupling portion, thereby preventing the battery cells from vibrating inside the housing.

DETAILED DESCRIPTION

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey the scope of the invention to those skilled in the art.

Figure 1:
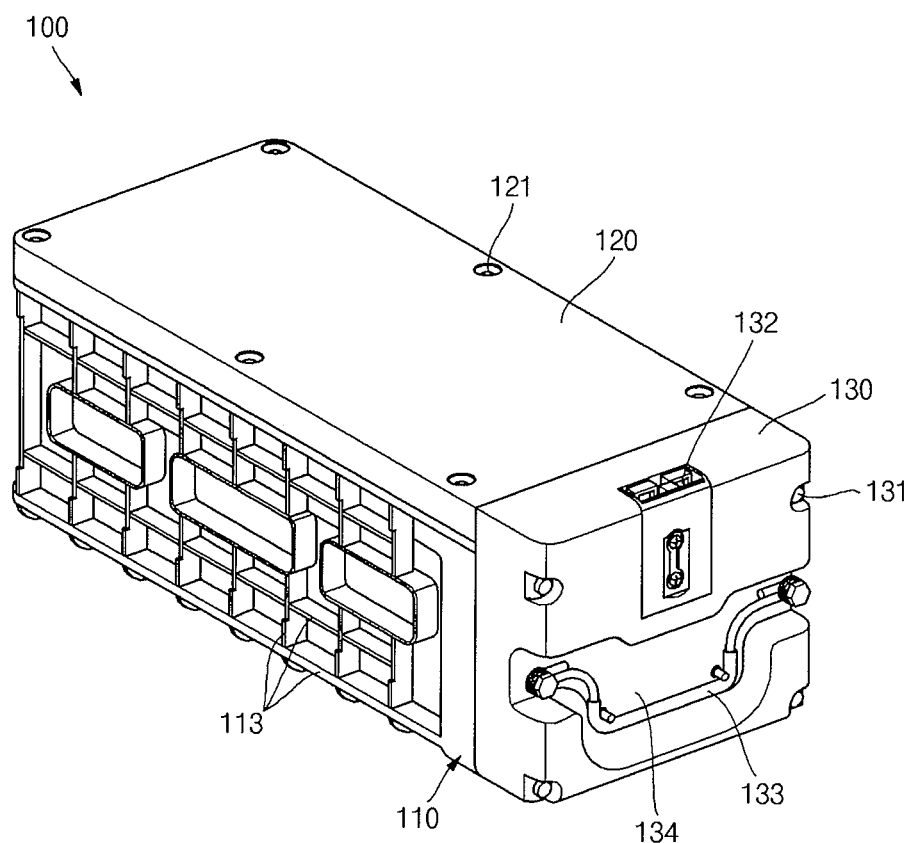
FIG. 1 is a perspective view of a battery pack according to an embodiment of the present invention.

FIG. 1 is a perspective view of a battery pack according to an embodiment of the present invention.

As shown in FIG. 1, the battery pack 100 may include a housing 110 accommodating a plurality of battery cells therein, an upper cover 120 covering an upper portion of the housing 110, and a front cover 130 covering a front portion of the housing 110.

Here, a plurality of reinforcement portions 113 may protrude from an outer surface of the housing 110 for the purpose of increasing the strength of the housing 110. In addition, the upper cover 120 may be coupled to the housing 110 by a plurality of bolts 121, and the front cover 130 may also be coupled to the housing 110 by the plurality of bolts 131. Further, the front cover 130 may include a connector 132 electrically connected to an external device (e.g., a charger or a load). Moreover, a handle 133 may be combined with the front cover 130 to provide for enhanced portability of the battery pack 100. Additionally, a handle groove 134 for accommodating the handle 133 may be formed in the front cover 130.

Figure 2:
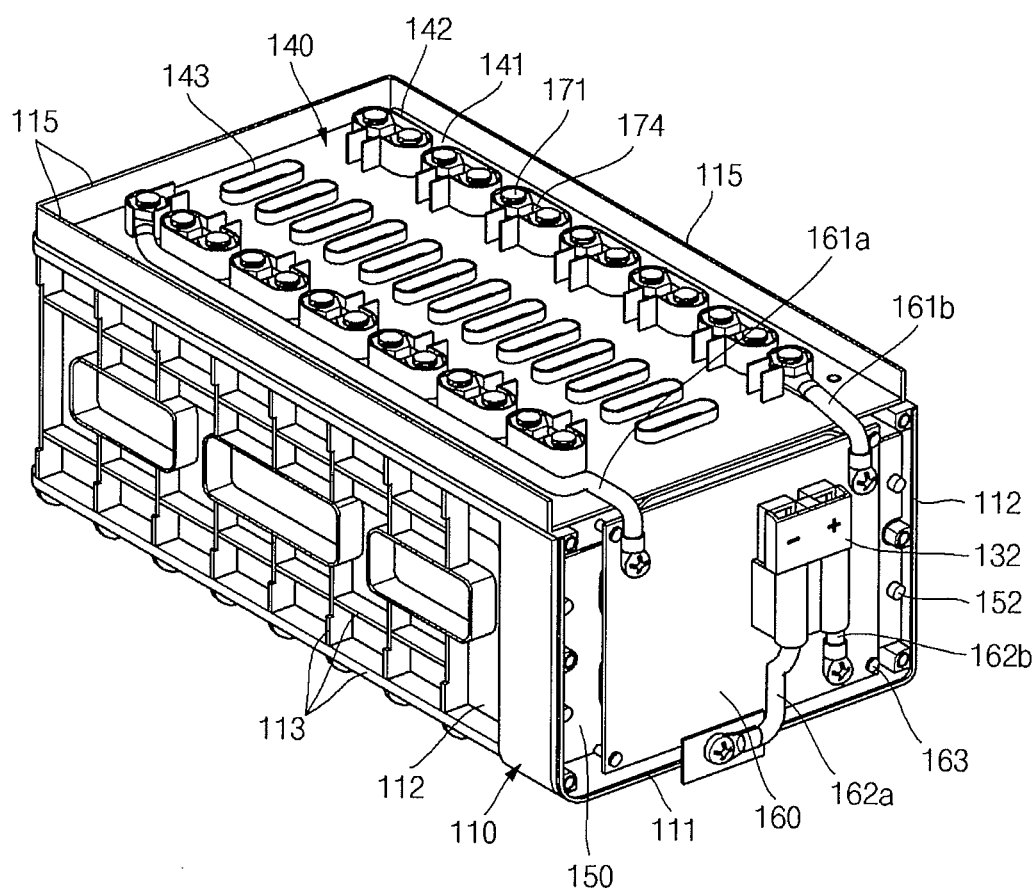
FIG. 2 is a perspective view illustrating a state in which an upper cover and a front cover are removed from the battery pack shown in FIG. 1.

FIG. 2 is a perspective view illustrating a state in which an upper cover and a front cover are removed from the battery pack shown in FIG. 1.

As shown in FIG. 2, in the battery pack according to an embodiment of the present invention, the housing 110 includes a bottom portion 111, and three sidewalls 112 connected to the bottom portion 111.

Here, the three sidewalls 112 upwardly extend from three edges of the bottom portion 111 and the plurality of battery cells are accommodated in an inner space formed by the bottom portion 111 and the three sidewalls 112. In addition, the housing 110 is configured such that its front and upper portions are open.

An upper coupling portion 115 coupled to the upper cover 120 protrudes from top ends of the three sidewalls 112. In addition, the middle cover 140 is positioned on a top surface of the housing 110, that is, at the interior of the upper coupling portion 115. The plurality of battery cells are positioned in the inner space formed by the middle cover 140 and the housing 110. The middle cover 140 includes a substantially plate-shaped body 141, a bus bar seating portion 142 formed on the body 141 to allow a plurality of bus bars 174 to be seated thereon, and a plurality of gas release guides 143 formed at locations generally corresponding to safety vents of the battery cells on the body 141. Here, the bus bars 174 electrically connect terminals 171 of adjacent battery cells to each other. In addition, first ends of power lines 161a and 161b are connected to individual bus bars 174.

In one embodiment, an end plate 150 and a BMS board 160 are located on the front of the housing 110. Second ends of the power lines 161a and 161b are connected to the BMS board 160. Further, the connector 132 is mechanically coupled to the BMS board 160 and electrically connected to the BMS board 160 by other power lines 162a and 162b. In addition, a plurality of electronic components for controlling charge/discharge and calculating capacities of battery cells are mounted on the BMS board 160. The BMS board 160 is coupled to the housing 110 by a plurality of bolts 163.

Figure 3:
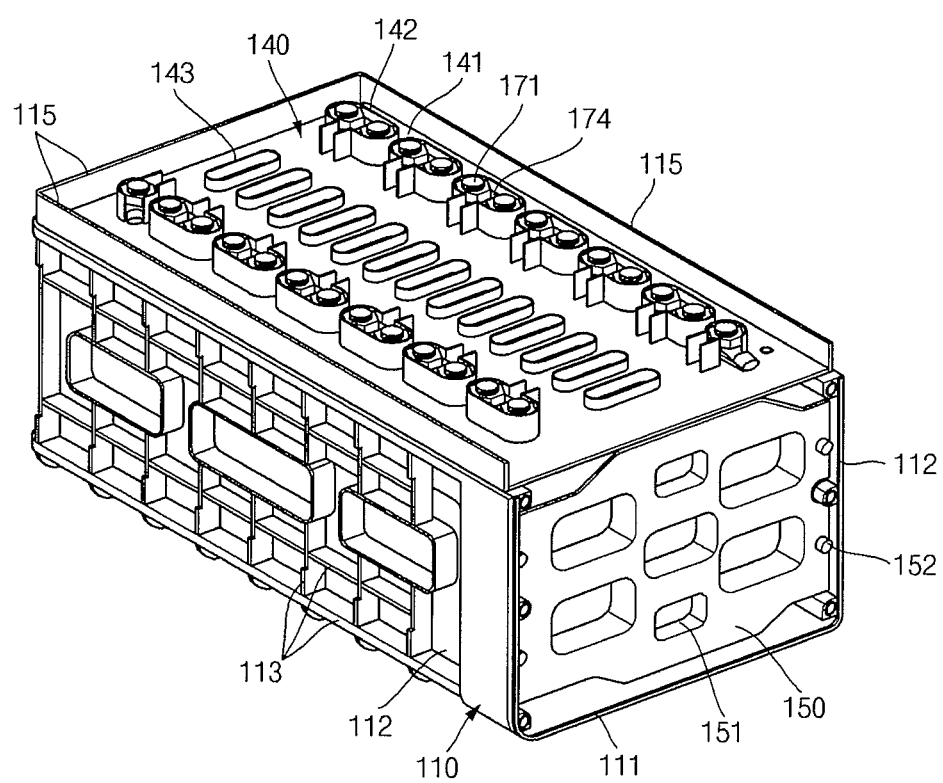
FIG. 3 is a perspective view illustrating a state in which a BMS board and a connector are removed from the battery pack shown in FIG. 1.

FIG. 3 is a perspective view illustrating a state in which a BMS board and a connector are removed from the battery pack shown in FIG. 1.

As shown in FIG. 3, the end plate 150 is connected to the front of the housing 110. The end plate 150 serves to securely contact the plurality of battery cells with the sidewalls 112 of the housing 110. In particular, the end plate 150 allows the plurality of battery cells to securely contact the sidewalls 112 of the housing 110 facing the end plate 150.

In addition, the end plate 150 includes a plurality of holes 151 for minimizing the overall weight of the end plate 150. The end plate 150 is coupled to the housing 110 by a plurality of bolts 152.

Figure 4:
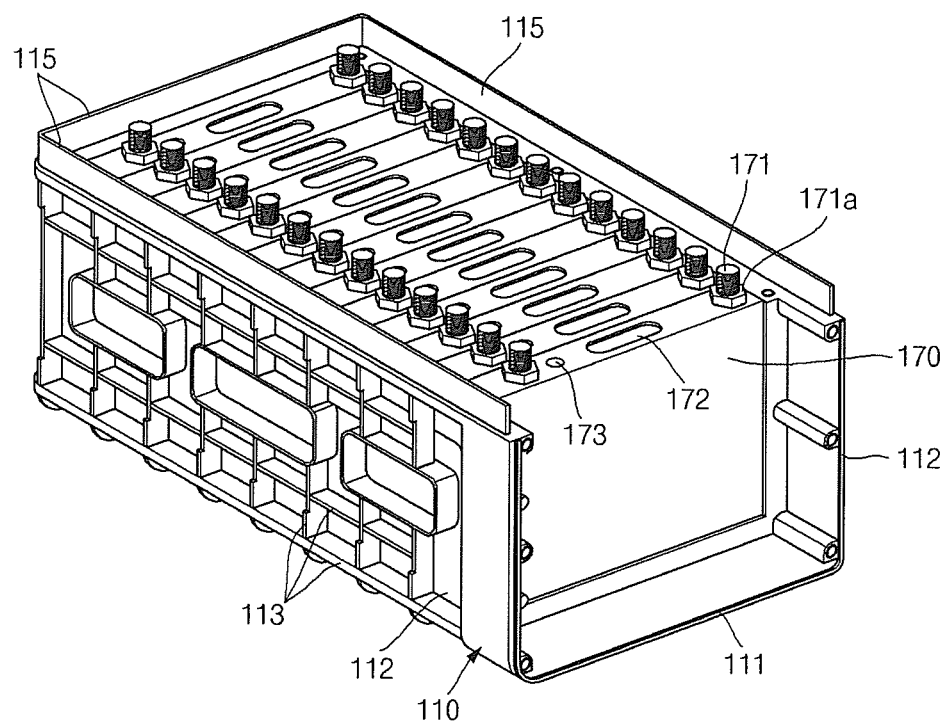
FIG. 4 is a perspective view illustrating a state in which a middle cover and an end plate are removed from the battery pack shown in FIG. 1.

FIG. 4 is a perspective view illustrating a state in which a middle cover and an end plate are removed from the battery pack shown in FIG. 1.

As shown in FIG. 4, a plurality of battery cells 170 are accommodated in an inner space formed by the bottom portion 111 and sidewalls 112 of the housing 110 in a state in which the plurality of battery cells 170 are stacked in a horizontal direction. Each of the plurality of battery cells 170 has one or more terminals 171 formed on its top surface. In addition, each of the plurality of battery cells 170 has a relatively thin safety vent 172 and a plug 173 closing an electrolyte injection hole formed on the top surface.

The bottom surface of the battery cell 170 is closely adhered to the bottom portion 111 of the housing 110. In addition, two narrow side surfaces of the battery cell 170 are closely adhered to the sidewalls 112 of the housing 110 facing each other. Further, the wide surface of the hindmost battery cell 170 among the plurality of battery cells 170 is closely adhered to the rear sidewall 112.

Figure 5:
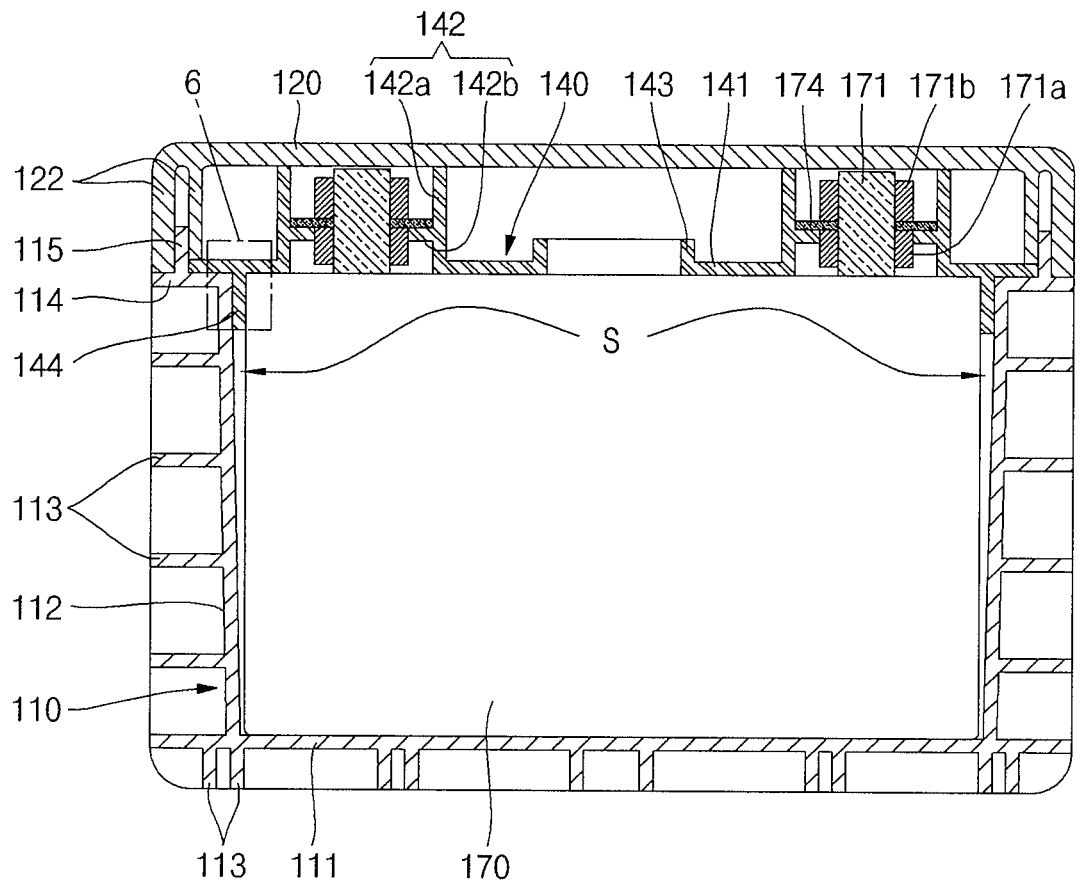
FIG. 5 is a longitudinal section view of FIG. 1.

FIG. 5 is a longitudinal section view of FIG. 1.

As shown in FIG. 5, the housing 110 includes a bottom portion 111 and sidewalls 112 extending from the perimeter of the bottom portion 111. In addition, a plurality of reinforcement portions 113 outwardly protrude on outer surfaces of the bottom portion 111 and the sidewalls 112 for the purpose of reinforcing the strength of the housing 110. Extending portions 114 protruding substantially outwardly are further formed on upper ends of the sidewalls 112. An upper coupling portion 115 coupled to the upper cover 120 upwardly protrudes from each of the extending portions 114.

Meanwhile, as described above, a plurality of battery cells 170 are accommodated in an inner space formed by the bottom portion 111 and the three sidewalls 112 of the housing 110. In addition, as described above, each of the plurality of battery cells 170 has one or more terminals 171 upwardly protruding, and a bus bar 174 is coupled to each of the one or more terminals 171.

The middle cover 140 is positioned on the top surface of the housing 110 and the plurality of battery cells 170. In other words, the middle cover 140 substantially covering the plurality of battery cells 170 is coupled between the housing 110 and the upper cover 120. The middle cover 140 further includes a coupling portion 144 provided at a gap or space S substantially between the sidewalls 112 of the housing 110 and each of the battery cells 170. In other words, the middle cover 140 further includes the coupling portion 144 downwardly fitted into the gap or space S between the sidewalls 112 of the housing 110 and the battery cell 170 for preventing the battery cells 170 from vibrating.

Further, the middle cover 140 includes a bus bar seating portion 142 having an internal hollow. The bus bar seating portion 142 includes an upper protrusion 142a and an internal middle protrusion 142b. A lower nut 171a coupled to the terminal 171 is positioned below the internal middle protrusion 142b, and a bus bar 174 coupled to the terminal 171 and an upper nut 171b are positioned above the internal middle protrusion 142b. Thus, the middle cover 140 may be fixed to the top surface of the housing 110 and the battery cell 170 by the bus bars 174 and the upper nut 171b. In addition, the middle cover 140 may include the plurality of gas release guides 143 having internal hollows, by which the internal gas can be quickly guided to the outside when the safety vent 172 (refer to FIG. 4) is opened.

In addition, the upper cover 120 is coupled to the upper coupling portion 115 formed in the extending portion 114 of the housing 110. To this end, spaced dual coupling portions 122 are formed along the perimeter of the upper cover 120 and extend downward. In other words, the upper coupling portion 115 of the housing 110 is coupled to the spaced dual coupling portions 122 of the upper cover 120. As described above, since the spaced dual coupling portions 122 formed in the upper cover 120 are coupled to the upper coupling portion 115 of the housing 110, external moisture or foreign material is less likely to infiltrate the battery pack 100.

Figure 6:
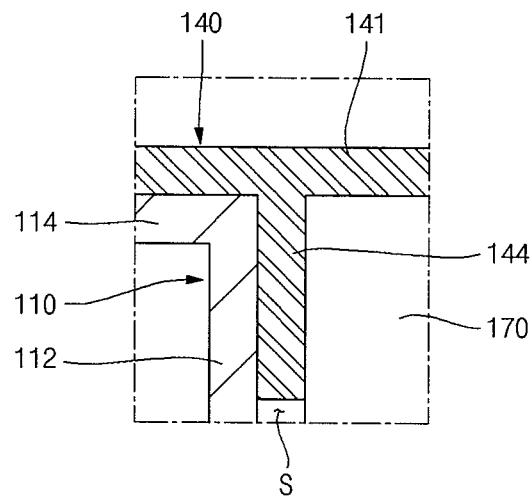
FIG. 6 is an enlarged section view of a portion 6 shown in FIG. 5.

FIG. 6 is an enlarged section view of a portion 6 shown in FIG. 5.

As shown in FIG. 6, a gap or space S exists between the sidewall 112 of the housing 110 and the battery cell 170. The space S is created because the housing 110 is formed by plastic injection molding using a mold. In detail, after the injection-molding of the housing 110, in order to easily extract the housing 110 from the mold, a draft gradient may be applied to the sidewall 112 of the housing 110. The sidewall 112 of the housing 110 with draft gradient is formed at an angle of approximately greater than 90° with respect to the bottom portion 111, and the space S is created between the sidewall 112 and the battery cell 170 accordingly. In particular, the larger the space S, the closer to the upper region between the sidewall 112 and the battery cell 170.

As described above, according to the present invention, with the draft gradient, the coupling portion 144 of the middle cover 140 is combined with the space S created between the sidewall 112 and the battery cell 170. In such a manner, the space S created between the sidewall 112 and the battery cell 170 is substantially eliminated, thereby preventing the battery cell 170 from vibrating inside the housing 110. In other words, the battery cell 170 closely contacts the coupling portion 144 formed in the middle cover 140, thereby preventing vibration of the battery cell 170.

The coupling portion 144 may be formed to have a substantially rectangular cross section. In addition, the coupling portion 144 may be formed to have a downwardly extending length of between about 1% and about 20% of a height of the sidewall 112 (or of the battery cell 170). When the downwardly extending length of the coupling portion 144 is between about 1% and about 20% of the height of the sidewall 112, the vibration of the battery cell 170 is suppressed most efficiently. If the downwardly extending length of the coupling portion 144 is less than 1% of the height of the sidewall 112, the coupling portion 144 may deviate from the space S between the sidewall 112 and the battery cell 170, rather than being combined therewith. On the other hand, if the downwardly extending length of the coupling portion 144 is greater than 20% of the height of the sidewall 112, the coupling portion 144 may not be properly combined with the space S between the sidewall 112 and the battery cell 170.

A thickness of the coupling portion 144 may be the same as or slightly greater than a width of the space S between the sidewall 112 and the battery cell 170. Practically, the coupling portion 144 is formed to have a thickness slightly greater than the width of the space S, so that the coupling portion 144 may be combined with the space S in a forced fitting type or interference fit. Therefore, the battery cell 170 comes into closer contact with the coupling portion 144, and vibration of the battery cell 170 can be suppressed more efficiently.

Figure 7A:
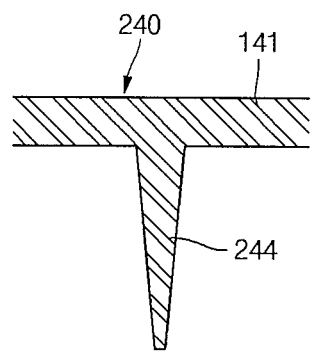
FIGS. 7A and 7B are section views illustrating modifications of coupling portions formed on the middle cover.
Figure 7B:
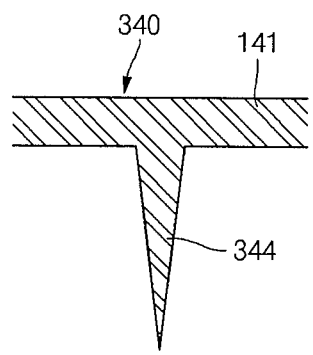
Figure 8:
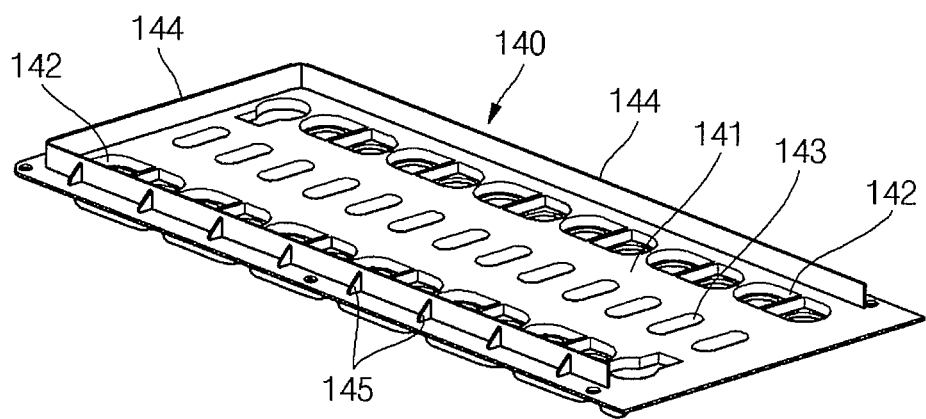
FIG. 8 is a perspective view illustrating a bottom surface of the middle cover in the battery pack shown in FIG. 1.

FIGS. 7A and 7B are section views illustrating modifications of coupling portions formed on the middle cover, and FIG. 8 is a perspective view illustrating a bottom surface of the middle cover in the battery pack shown in FIG. 1.

As shown in FIGS. 7A and 7B, coupling portions 244 and 344 of middle covers 240 and 340 may be formed to have a substantially inverted trapezoidal section and a substantially inverted triangular section, respectively. In other words, thicknesses of the coupling portions 244 and 344 gradually decrease in the direction away from an upper end to a lower end. Accordingly, the coupling portions 244 and 344 are easily guided into the space between the sidewall 112 of the housing 110 and the battery cell 170. In other words, since each of the coupling portions 244 and 344 is thinner at the lower end thereof than at the upper end, the lower end of the coupling portion 144 is easily inserted into the space. As will be appreciated, the cross-sectional shape of the coupling portions is not limited to those described herein, but rather may be of any suitable shape to close a gap between the battery module (i.e., the plurality of battery cells 170) and the housing 110.

As shown in FIG. 8, the coupling portion 144 is formed along the perimeter of the body 141 of the middle cover 140. For example, the coupling portion 144 may be formed in at least three sides of the perimeter of the body 141. Therefore, the coupling portion 144 is combined with the three-sided space formed between the at least three sidewall of the housing and the battery cell. In addition, a plurality of bus bar seating portions 142 each having a hollow and a plurality of gas release guides 143 each having a hollow are formed in the body 141 formed at an interior area of the coupling portion 144.

In one embodiment, a plurality of auxiliary coupling portions 145 of a substantially triangular shape are further formed at the exterior area of the coupling portion 144. In other words, the auxiliary coupling portions 145 are formed in a direction substantially perpendicular to a lengthwise direction of the coupling portion 144. The auxiliary coupling portions 145 may be formed at a pitch, and may be coupled to auxiliary coupling groove 116 provided at the sidewall 112 of the housing 110 (refer to FIG. 9).

Figure 9:
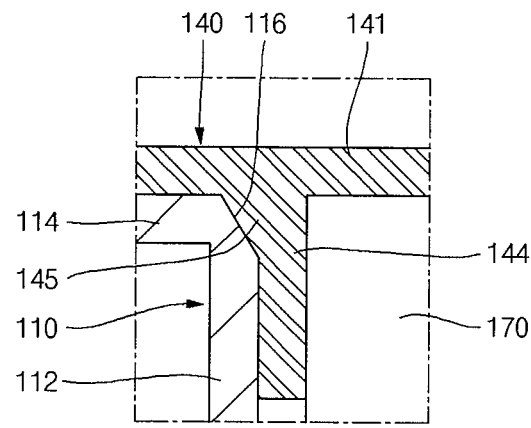
FIG. 9 is an enlarged view illustrating a connection relationship between an auxiliary coupling portion of the middle cover and an auxiliary coupling groove of the housing in the battery pack shown in FIG. 1.

FIG. 9 is an enlarged view illustrating a connection relationship between an auxiliary coupling portion of the middle cover and an auxiliary coupling groove of the housing in the battery pack shown in FIG. 1.

As shown in FIG. 9, the middle cover 140 has auxiliary coupling portions 145 of a substantially triangular shape further formed at the exterior area of the coupling portion 144. The auxiliary coupling portions 145 may be coupled to auxiliary coupling grooves 116 provided at the sidewall 112 of the housing 110. Therefore, according to the present invention, since the coupling portion 144 of the middle cover 140 is combined with the space between the sidewall 112 of the housing 110, and the auxiliary coupling portions 145 of the middle cover 140 are coupled to the auxiliary coupling grooves 116 formed on the sidewall 112 of the housing 110, a coupling strength between the housing 110 and the middle cover 140 is further increased. As will be appreciated, the shape of the auxiliary coupling portion 145 is not limited to the shapes described here, but rather may be of any appropriate shape to engage a corresponding groove.

Figure 10:
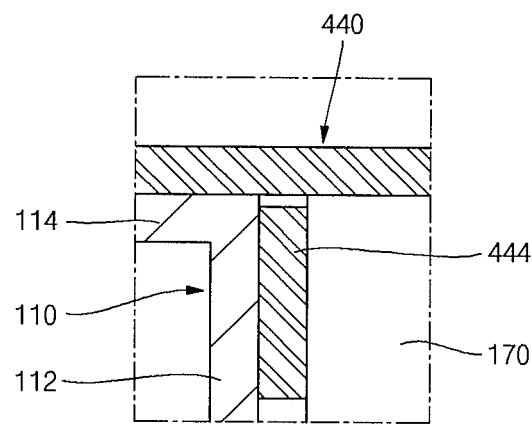
FIG. 10 is a section view illustrating a coupling portion coupled between a battery cell and a housing in a battery pack according to another embodiment of the present invention.
Figure 11A:
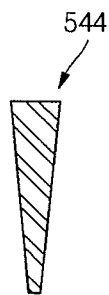
FIGS. 11A through 11D are section views illustrating alternative modifications of coupling portions.
Figure 11B:
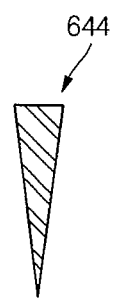
Figure 11C:
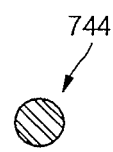
Figure 11D:
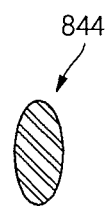

FIG. 10 is a section view illustrating a coupling portion coupled between a battery cell and a housing in a battery pack according to another embodiment of the present invention.

As shown in FIG. 10 according to another embodiment of the present invention, the coupling portion 444 and the middle cover 440 are not formed integrally with each other but rather are formed discretely from each other as separate components. Thus, the discrete coupling portion 444 is first combined with the space between the sidewall 112 of the housing 110 and the battery cell 170, and the middle cover 440 is then seated thereon. Here, the discrete coupling portion 444 may also be formed to have a substantially rectangular cross section. The length and width of the discrete coupling portion 444 are substantially the same as those described above, and detailed descriptions thereabout will not be given.

FIGS. 11A through 11D are section views illustrating alternative modifications of coupling portions.

As shown in FIGS. 11A through 11D, discrete coupling portions 544, 644, 744, and 844 may be formed to have shapes of an inverted trapezoid, an inverted triangle, a circle, and an oval, respectively. Here, the inverted trapezoidal or the inverted triangular shaped coupling portion 544, 644 may be easily fitted into the space between the housing 110 and the battery cell 170.

Figure 12:
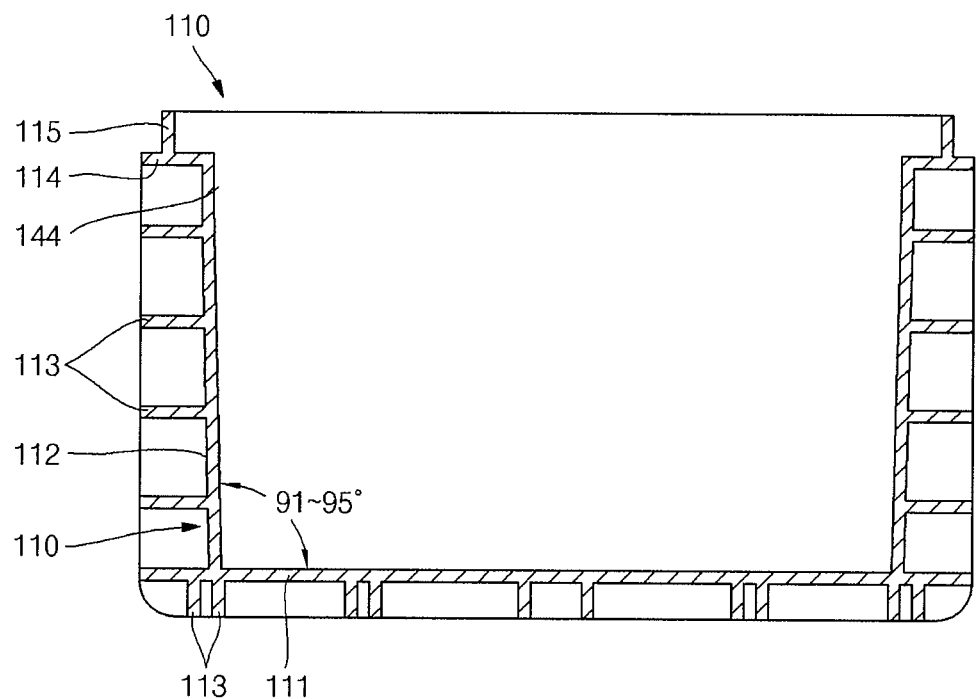
FIG. 12 is a schematic section view exaggeratedly illustrating a relationship between a bottom portion and sidewalls of the housing in the battery pack shown in FIG. 1.

FIG. 12 is a section view exaggeratedly illustrating a relationship between a bottom portion and a sidewalls of the housing in the battery pack shown in FIG. 1.

As shown in FIG. 12, the housing 110 is formed such that the bottom portion 111 and the sidewall 112 are disposed at an angle ranging from approximately 91° to approximately 95°, instead of 90°, with respect to each other. In other words, in the battery pack 100, in order to facilitate extraction of the housing 110 from a mold during an injection-molding operation, a draft gradient is applied to the sidewall of the housing 110. The draft gradient is generally in the range of approximately 1° to approximately 5°. Accordingly, the sidewall 112 of the housing 110 tapers downward, creating a space between the sidewall 112 of the housing 110 and the battery cell 170.

The housing 110 is formed by injection molding a plastic resin using a mold. The plastic resin may be at least one selected from the group consisting of Acrylonitrile-Butadience-Stryene (ABS), Polyamide (PA), PolyCarbonate (PC), PolyChloroTriFluoroethylene (PCTFE), Poly DiAllyl Phthalate (PDAP), Poly Ethylene (PE), Poly Ethylene TerePhthalate (PETP), Phenol-Formaldehyde (PF), Polyisobutylene (PIB), Poly Methyl MethAcrylate (PMMA), Polyoxymethylene (POM); Polyformaldehyde (PF), PolyPropylene (PP), PolyStyrene (PS), PolyTetraFluoroEthylene (PTFE), Polyurethane (PUR), Poly Vinyl Acetate (PVAC), Poly Vinyl Alcohol (PVA), Poly Vinyl Butyral (PVB), Poly Vinyl Chloride (PVC), Poly Vinyl Chloride Acetate (PVCA), Poly VinyliDene Chloride (PVDC), Poly Vinyl Fluoride (PVF), Poly Vinyl ForMal (PVFM), and equivalents thereof, but aspects of the invention are not limited to those listed herein as the material of the housing 110.

Figure 13:
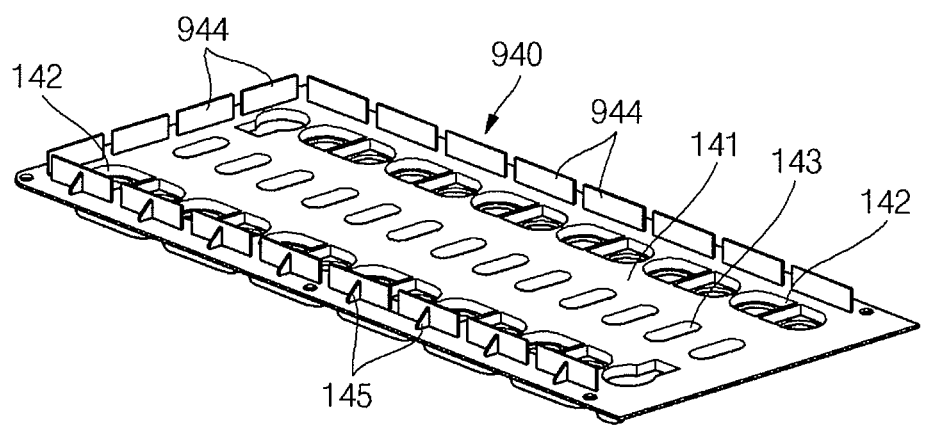
FIG. 13 is a perspective view illustrating a bottom surface of a middle cover in a battery pack according to another embodiment of the present invention.

FIG. 13 is a perspective view illustrating a bottom surface of a middle cover in a battery pack according to another embodiment of the present invention.

As shown in FIG. 13, the middle cover 940 includes a plurality of spaced coupling portions 944. In other words, the coupling portions 944 are generally formed on at least three sides of the perimeter of the body 141 of the middle cover 940. In one embodiment, the coupling portions 944 are formed to be separated or spaced from each other. Therefore, a gap or space is created between two adjacent coupling portions 944. Additionally, each of the coupling portions may include an auxiliary coupling portion 145.

Although FIG. 13 illustrates the coupling portions 944 extending from the body 141 of the middle cover 940, the coupling portions 944 may also be formed to be separate from and spaced from the body 141.

In such a manner, the coupling portions 944 are combined with the gap created between each of sidewalls of a housing and a battery cell, thereby preventing the battery cells from vibrating inside the housing.

Figure 14:
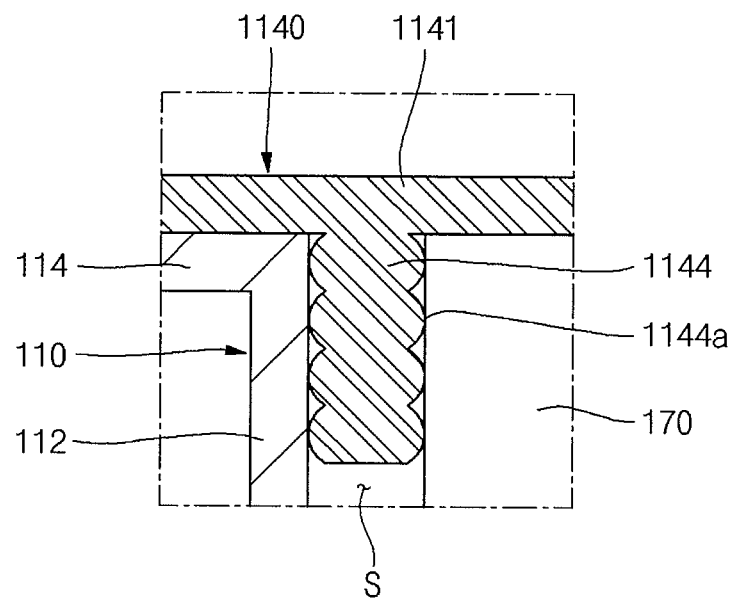
FIG. 14 is a sectional view illustrating a modification of a coupling portion formed in the middle cover.

FIG. 14 is a sectional view illustrating a modification of a coupling portion formed in the middle cover.

As shown in FIG. 14, the coupling portion 1144 includes a plurality of protrusions, irregularities or embossed portions 1144a on its surface. The plurality of protrusions, irregularities or embossed portions 1144a protrude from the surface of the coupling portion 1144, thereby allowing the coupling portion 1144 to be more closely adhered to a space S between a sidewall 112 and a battery cell 170.

Although FIG. 14 illustrates the coupling portion 1144 formed to extend from a body 1141 of a middle cover 1140, the coupling portion 1144 may also be formed to be separate from and spaced from the body 1141.

Figure 15:
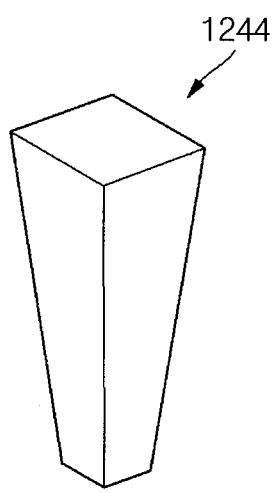
FIG. 15 is a sectional view illustrating a coupling portion or a wedge coupled between a battery cell and a housing in a battery pack according to another embodiment of the present invention.

FIG. 15 is a sectional view illustrating a coupling portion or a wedge coupled between a battery cell and a housing in a battery pack according to another embodiment of the present invention.

As shown in FIG. 15, the coupling portion 1244 may be a wedge formed to be separate from a body of a middle cover. For example, the coupling portion 1244 may be a wedge that tapers downwardly (as shown in FIG. 15). A plurality of coupling portions 1244 may be included in the battery pack, each shaped of a wedge to be fitted into a space between a sidewall of the housing and the battery cell. Therefore, the plurality of coupling portions 1244 or wedges may prevent the battery cell located at an interior area of the housing from vibrating.

Figure 16:
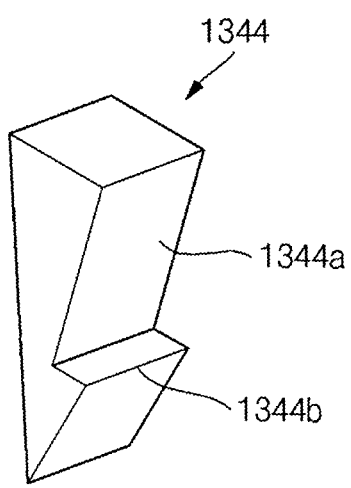
FIG. 16 is a sectional view illustrating a coupling portion or a wedge coupled between a battery cell and a housing in a battery pack according to another embodiment of the present invention.

FIG. 16 is a sectional view illustrating a coupling portion or a wedge coupled between a battery cell and a housing in a battery pack according to another embodiment of the present invention.

As shown in FIG. 16, the coupling portion 1344 may be a wedge including a first area 1344a that tapers downwardly, and a second area that laterally protrudes from the first area 1344a in a step configuration and then tapers downwardly. A plurality of coupling portions or wedges 1344 may be included in the battery pack to be fitted into a space between the sidewall of the housing and a battery cell. Particularly, each of the coupling portions 1344 or wedges includes the second area 1344b laterally protruding from the first area 1344a. Thus, once the coupling portions 1344 or wedges are fitted into the space between the sidewall of the housing and the battery cell, they are not readily loosened from the space, thereby preventing the battery cell located at an interior area of the housing from vibrating. Although the battery pack according to exemplary embodiments of the present invention have been described for illustrative purposes, those skilled in the art will appreciate that various modifications are possible without departing from the scope and spirit of the invention as disclosed in the appended claims.

DESCRIPTION OF THE SYMBOLS IN
MAIN PORTIONS OF THE DRAWINGS

| | |
|---|---|
| 100: Battery Pack | |
| 110: Housing | 111: Bottom Portion |
| 112: Sidewalls | 113: Reinforcement Portion |
| 114: Extending Portion | 115: Upper Coupling Portion |
| 116: Auxiliary Coupling Groove | 120: Upper Cover |
| 122: Dual Lower Coupling Portions | 130: Front Cover |
| 132: Connector | 133: Handle |

-continued

DESCRIPTION OF THE SYMBOLS IN
MAIN PORTIONS OF THE DRAWINGS

| | |
|---|---|
| 134: Handle Groove | 140: Middle Cover |
| 141: Body | 142: Bus Bar Seating Portion |
| 142a: Upper Protrusion | 142b: Internal Middle Protrusion |
| 143: Gas Release Guide | 144: Coupling Portion |
| 145: Auxiliary Coupling Portion | 150: End Plate |
| 151: Hole | 160: BMS Board |
| 161,162: Power Line | 163: Bolt |
| 170: Battery Cell | 171: Terminal |
| 171a: 171b: Nut | 172: Safety vent |
| 173: Plug | 174: Bus bar |

What is claimed is:

1. A battery pack comprising:
a battery module comprising at least one battery cell;
a housing accommodating the at least one battery cell, the housing comprising a bottom wall and a plurality of side walls extending from the bottom wall and each having a first surface facing the at least one battery cell, wherein the first surface of each side wall contacts that bottom wall, an angle between the first surface of each side wall and the bottom wall is greater than 90 degrees such that a wide of a gap between the first surface of each side wall and the at least one battery cell increases from the bottom to the top of the housing; and
a cover covering the battery module, the cover having a body and a coupling portion extending from the body and having a constant thickness along its entire length,
wherein the coupling portion is within the gap between at least one of the side walls and the at least one battery cell,
wherein the coupling portion has a first surface opposing and spaced from a second surface,
wherein the first surface of the coupling portion contacts only at least one of the side walls of the housing and the second surface of the coupling portion contacts only the battery module, and
wherein a thickness of the coupling portion is equal to or greater than a width of the gap between at least one of the side wall and the at least one battery cell.

2. The battery pack of claim 1, wherein the coupling portion extends in a direction away from the body.

3. The battery pack of claim 1, wherein the coupling portion has a length of between about 1% and about 20% of a length of the at least one of the side walls.

4. The battery pack of claim 1, wherein an end of the coupling portion is substantially planar.

5. The battery pack of claim 1, wherein the coupling portion corresponds to three sides of the battery module.

6. The battery pack of claim 1, further comprising an upper cover coupled to the housing, wherein the cover is substantially between the upper cover and the battery module.

7. The battery pack of claim 1, wherein the side walls have a plurality of coupling grooves and wherein the coupling portion comprises a plurality of auxiliary couplers, each of the auxiliary couplers being located in a respective one of the coupling grooves.

8. The battery pack of claim 1, wherein the body and the coupling portion are separate components.

9. The battery pack of claim 1, wherein a cross-section of the coupling portion is substantially rectangular.

10. The battery pack of claim 1, wherein an angle between the side walls and the bottom plate is between about 91 degrees and about 95 degrees.

11. The battery pack of claim 1, wherein the at least one battery cell comprises a plurality of battery cells and the battery module comprises a plurality of bus bars, each of the bus bars extending between adjacent ones of the battery cells to electrically connect the battery cells to each other, and wherein the cover has a plurality of bus bar accommodating portions each of the bus bar accommodating portions contacting a respective one of the bus bars.

12. The battery pack of claim 11, wherein each of the bus bar accommodating portions comprises a first flange extending in a direction away from the bottom plate and a second flange extending from and in a direction substantially perpendicular to the first flange.

13. The battery pack of claim 1, wherein the cover has a plurality of gas release openings, each of the gas release openings corresponding to a respective one of the at least one battery cell.

14. The battery pack of claim 1, wherein the coupling portion is continuous along a periphery of the body.

15. The battery pack of claim 14, wherein the coupling portion is substantially U-shaped.

* * * * *